(12) United States Patent
Kaptsan (10) Patent No.: US 9,454,623 B1
(45) Date of Patent: Sep. 27, 2016

(54) SOCIAL COMPUTER-AIDED ENGINEERING DESIGN PROJECTS

(75) Inventor: Igor Kaptsan, Downingtown, PA (US)

(73) Assignee: BENTLEY SYSTEMS, INCORPORATED, Exton, PA (US)

( * ) Notice: Subject to any disclaimer, the term of this patent is extended or adjusted under 35 U.S.C. 154(b) by 788 days.

(21) Appl. No.: 12/970,634

(22) Filed: Dec. 16, 2010

(51) Int. Cl.
*G06F 17/50* (2006.01)
*G06Q 10/10* (2012.01)

(52) U.S. Cl.
CPC ............ *G06F 17/50* (2013.01); *G06Q 10/101* (2013.01)

(58) Field of Classification Search
CPC .. G06F 17/50; G06F 17/5086; G06Q 10/101
See application file for complete search history.

(56) References Cited

U.S. PATENT DOCUMENTS

| | | | |
|---|---|---|---|
| 7,069,592 B2 * | 6/2006 | Porcari | 726/26 |
| 7,176,942 B2 | 2/2007 | Chartier et al. | |
| 7,194,489 B2 | 3/2007 | Bentley et al. | |
| 7,337,093 B2 | 2/2008 | Ramani et al. | |
| 7,571,392 B2 | 8/2009 | Cortesi | |
| 7,661,101 B2 * | 2/2010 | Chadzynski | G06F 9/541 717/164 |
| 7,689,387 B2 | 3/2010 | Mathews et al. | |
| 7,698,323 B1 * | 4/2010 | Rangan et al. | 707/695 |
| 7,814,429 B2 | 10/2010 | Buffet et al. | |
| 2002/0056577 A1 * | 5/2002 | Kaye et al. | 178/18.03 |
| 2003/0023679 A1 * | 1/2003 | Johnson et al. | 709/204 |
| 2003/0179230 A1 * | 9/2003 | Seidman | 345/750 |
| 2004/0107249 A1 * | 6/2004 | Moser et al. | 709/204 |
| 2004/0157641 A1 * | 8/2004 | Chithambaram et al. | 455/556.2 |
| 2004/0236754 A1 * | 11/2004 | Workman et al. | 707/10 |
| 2005/0246628 A1 * | 11/2005 | Peterson | 715/513 |
| 2006/0053380 A1 * | 3/2006 | Spataro et al. | 715/753 |
| 2006/0265496 A1 * | 11/2006 | Freitag | 709/224 |
| 2007/0044017 A1 * | 2/2007 | Zhu et al. | 715/530 |
| 2008/0229215 A1 * | 9/2008 | Baron et al. | 715/751 |
| 2010/0241972 A1 * | 9/2010 | Spataro et al. | 715/753 |
| 2010/0275137 A1 * | 10/2010 | Rivers-Moore et al. | 715/760 |
| 2011/0016409 A1 * | 1/2011 | Grosz et al. | 715/753 |
| 2011/0225511 A1 * | 9/2011 | Xu | 715/753 |
| 2012/0173962 A1 * | 7/2012 | Oh et al. | 715/234 |
| 2012/0278388 A1 * | 11/2012 | Kleinbart et al. | 709/204 |
| 2013/0132485 A1 * | 5/2013 | Thomas et al. | 709/205 |
| 2014/0074913 A1 * | 3/2014 | Claydon | 709/203 |

* cited by examiner

*Primary Examiner* — Ryan Pitaro
(74) *Attorney, Agent, or Firm* — Cesari and McKenna, LLP; James A. Blanchette (57) ABSTRACT

In one embodiment of the present disclosure, the capabilities of a social collaboration application are leveraged to permit synchronized viewing of computer aided design (CAD) models and exchange of annotations (e.g., redlines) related thereto, in a social review session involving differing applications executing on different computers. By utilizing the capabilities of the social collaboration application as a transport mechanism, users operating differing applications on different computers may participate in the social review session for the CAD model, thereby allowing users who do not, for example, have access to the application in which the CAD model was developed to be part of the review process.

24 Claims, 8 Drawing Sheets

SOCIAL COMPUTER-AIDED ENGINEERING DESIGN PROJECTS

BACKGROUND

1. Technical Field

The present disclosure relates generally to computer-aided design (CAD) and more specifically to techniques for social review of CAD models.

2. Background Information

To better manage the complexities of modern designs, design professionals often turn to CAD. One or more users (e.g., architects, engineers, etc.) may create a model in a CAD application that embodies a project. The initial CAD model is typically refined as the project evolves, based on input from various other users (e.g., stakeholders) associated with the project. The users may collaborate in person, via telephone calls, or various known collaboration software. Once some level of agreement is reached regarding aspects of the project, the CAD model may be used to generate construction or manufacturing documentation (such as detailed elevations, perspectives, sections and plans) useful in executing the project.

One issue with current collaboration techniques used with CAD models is that they may not effectively allow users to review and comment on the CAD models in real time with each user able to able to contribute to the review process, when the users utilize differing software applications. General purpose collaboration software typically does not include functionality suited for interactive review of CAD models. Further, existing engineering project team collaboration software typically requires each user to have a copy of the engineering project team collaboration software, to utilize any collaboration functionality. A user (e.g., an outsider party) who does not have a copy of the engineering project team collaboration software may be unable to be involved in any review of a CAD model, and thereby prevented from contributing. Even if a user has an ability to share a screen with other users, the others are typically not able to be active participants in an interactive review process.

Accordingly, there is a need for improved techniques for social review of designs.

SUMMARY

In one embodiment of the present disclosure, the capabilities of a social collaboration application are leveraged to permit synchronized viewing of computer aided design (CAD) models and exchange of annotations (e.g., redlines) related thereto, in a social review session involving differing applications executing on different computers. By utilizing the capabilities of the social collaboration application as a transport mechanism, users operating differing applications on different computers may participate in the social review session for the CAD model, thereby allowing users who do not, for example, have access to the application in which the CAD model was developed to be part of the review process.

A first user of a first computer (e.g., an architect of the CAD model) may have a social collaboration application as well as a computer aided design (CAD) platform and/or an engineering project team collaboration application on their computer. An abstraction layer on the first computer is provided to interface therebetween. The abstraction layer may propagate a contact list with contacts (e.g., imported from the social collaboration application). The contacts displayed in the contact list may be all of the user's contacts, or, alternatively, may be a special subset of contacts, that have been filtered from a larger contact list based on their association with the CAD model, based on their association with a particular project, or otherwise.

Selected contacts may be invited to join the social review session. During the social review session the capabilities of the social collaboration application may be used to permit video and voice conferencing between the users. Further, synchronized viewing of the CAD model and exchange of annotations (e.g., redlines) related thereto may be permitted. The abstraction layer on the first computer may be utilized to receive indications of the first user's current view (e.g., view parameters) of the CAD model, as well as any annotations (e.g., redlines) relating to the current view. The abstraction layer then interfaces with an application program interface (API) of the social collaboration application to transmit such information using the social collaboration application's data exchange capabilities to one or more other users in the social review session. For instance, a second user on a second computer may likewise have a social collaboration application as well as a CAD platform and/or an engineering project team collaboration application on their computer. In such case, an abstraction layer operating on the second user's computer may receive the indication of the current view (e.g., view parameters) of the CAD model (e.g., so a dynamic view of the CAD model may be shown), as well as the annotations (e.g., redlines) relating to the current view, from the API of the social collaboration application on the second computer, and cause an update of the display of the CAD model in a CAD platform or an engineering project team collaboration application, as the case may be, on the second computer. Similarly, the second user may themselves change the current view and make their own annotations. The abstraction layer on the second computer may pass an indication of the current view (e.g., view parameters) of the CAD model, as well as any annotations (e.g., redlines), to the API of the social collaboration application on the second computer, for transmission by the social collaboration application back to the first computer. Such information may be propagated through the API of the social collaboration application on the first computer, to the CAD platform or the engineering project team collaboration application, as the case may be, executing on the first computer, to update the display.

Furthermore, a social review session may be established with one or more users that lack a CAD platform or an engineering project team collaboration application on their computer, but may at least have access to a web browser. For instance, a social review session may be established with a third user of a third computer. Again, the abstraction layer on the first computer may be utilized to receive indications of the current view of the CAD model of the first computer (e.g., here, instead of view parameters, snapshots may be used), as well as any annotations (e.g., redlines) relating to the current view. The abstraction layer on the first computer may then interface with the API of the social collaboration application on the first computer to transmit such information using the social collaboration application's data exchange capabilities. A social collaboration application on the third computer may receive such information and pass it, via the social collaboration application's API, and an abstraction layer, to a web client executing within a web browser on the third computer. The web client may thereafter cause display of the current view of the CAD model (e.g., snapshots, or a dynamic view of the CAD model), as well as any annotations (e.g., redlines) relating to the current view, in the web browser. Similarly, the third user on the third computer may themselves make their own manipulations and annotations. The web client on the third computer may pass indications of the current view (e.g., snapshots), as well as annotations (e.g., redlines), to the API of the social collaboration application on the third computer, for transmission by the social collaboration application back to the first computer. Such information may be propagated through the API of the social collaboration application on the first computer to the CAD platform or the engineering project team collaboration application, as the case may be, executing on the first computer, to update the display.

During the social review session, snapshots of the current view and annotations (e.g., redlines) may be stored in association with time stamps, thereby creating a chronological record of the social review session. Such snapshots and annotations (e.g., redlines) may be later reviewed (e.g., played back), published to a wiki or other web page, or otherwise utilized after the social review session is complete. When published to a wiki or other web page, audio, video and other content exchanged in the social review session may also be included.

BRIEF DESCRIPTION OF THE DRAWINGS

The description below refers to the accompanying drawings, of which.

DETAILED DESCRIPTION

Figure 1:
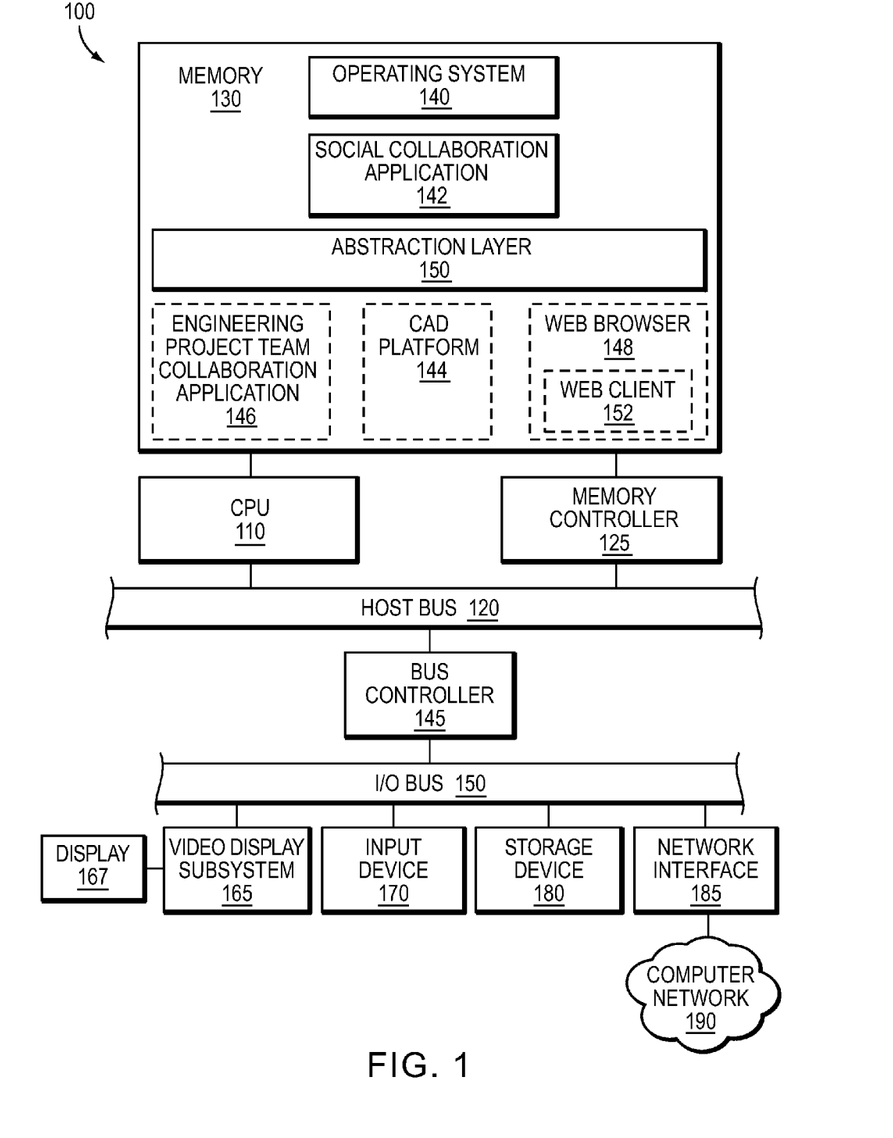
FIG. 1 is a block diagram of an example computer in which at least some of the presently described techniques may be employed.

FIG. 1 is a block diagram of an example computer 100 (e.g., a desktop computer), in which at least some of the presently described techniques may be employed. The computer 100 includes at least one central processing unit (CPU) 110 coupled to a host bus 120. The CPU 110 may be any of a variety of commercially available processors, such as an Intel x86/x64 processor, or another type of processor. A volatile memory 130, such as a Random Access Memory (RAM), is coupled to the host bus 120 via a memory controller 125. The memory 130 is adapted to store at least a portion of an operating system 140 while the computer 100 is operating. A social collaboration application 142 may also be loaded. In one embodiment, the social collaboration application 142 may be the Skype® conferencing software available from Skype Limited of Luxemborg. However, it should be understood that the social collaboration application 142 may alternatively be any of a variety of other known social collaboration software.

In addition, the memory 130 may store portions of a computer aided design (CAD) platform 144, an engineering project team collaboration application 146, and/or a web browser 148. It should be understood that, depending on the configuration of the computer 100, all three applications 144-148 may be available on the computer 100, or alternatively, only a selected one of the three applications 144-148 may be present. In one embodiment, the CAD platform 144 may be the MicroStation® platform available from Bentley Systems Inc. of Exton, Pa., the engineering project team collaboration application 146 may be the ProjectWise® project team collaboration software also available from Bentley Systems Inc., and the web browser 148 may be the Windows Internet Explorer® browser available from Microsoft Corporation or Redmond, Wash. However, it should be understood that the CAD platform 144, the engineering project team collaboration application 146, and the web browser 148 may alternatively be any of a variety of other software applications.

Further, in some configurations, an abstraction layer 150 may also be loaded into memory 130. As discussed in detail below, the abstraction layer 150 may act as an interface between the CAD platform 144 or the engineering project team collaboration application 146, and the social collaboration application 142, to facilitate techniques for social review of CAD models. Furthermore, in other configurations, a web client 152 may be loaded into the memory 130 and operate within the web browser 148, to facilitate techniques for social review of CAD models.

Furthermore, the host bus 120 of the computer 100 is coupled to an input/output (I/O) bus 160 through a bus controller 145. A video display subsystem 165, and a display screen 167, is coupled to the I/O bus 160. The display screen 167 may show, as the case may be, a user interface of the social collaboration application 142, of the CAD platform 144, of the engineering project team collaboration application 146, of the web browser 148, as well as a social review interface (the details of which are discussed below), that may be separate from such other interfaces, or incorporated as a sub-portion thereof. One or more input devices 170, such as a keyboard, a mouse, etc., are provided and used for interaction with the computer 100. A persistent storage device 180, such as hard disk drive, a solid-state drive, or other type or persistent data store, is coupled to the I/O bus 150, and may persistently store data, including computer-executable instructions for the software discussed above. Persistently stored data may be loaded into the volatile memory 130 when needed. The I/O bus 160 may further be coupled to a network interface 185 that interfaces via a computer network 190 with one or more other computers (not shown), for example, a second computer, a third computer, etc. Each other computer may include components similar to computer 100.

In one embodiment of the present disclosure, the capabilities of a social collaboration application 142 are leveraged to permit synchronized viewing of CAD models and exchange of annotations (e.g., redlines) related thereto, in a social review session involving differing applications executing on different computers. By utilizing the capabilities of the social collaboration application 142 as a transport mechanism, users operating differing applications on different computers may participate in the social review session, thereby allowing users who do not, for example, have access to the application in which the CAD model was developed to be part of the review process.

Figure 2:
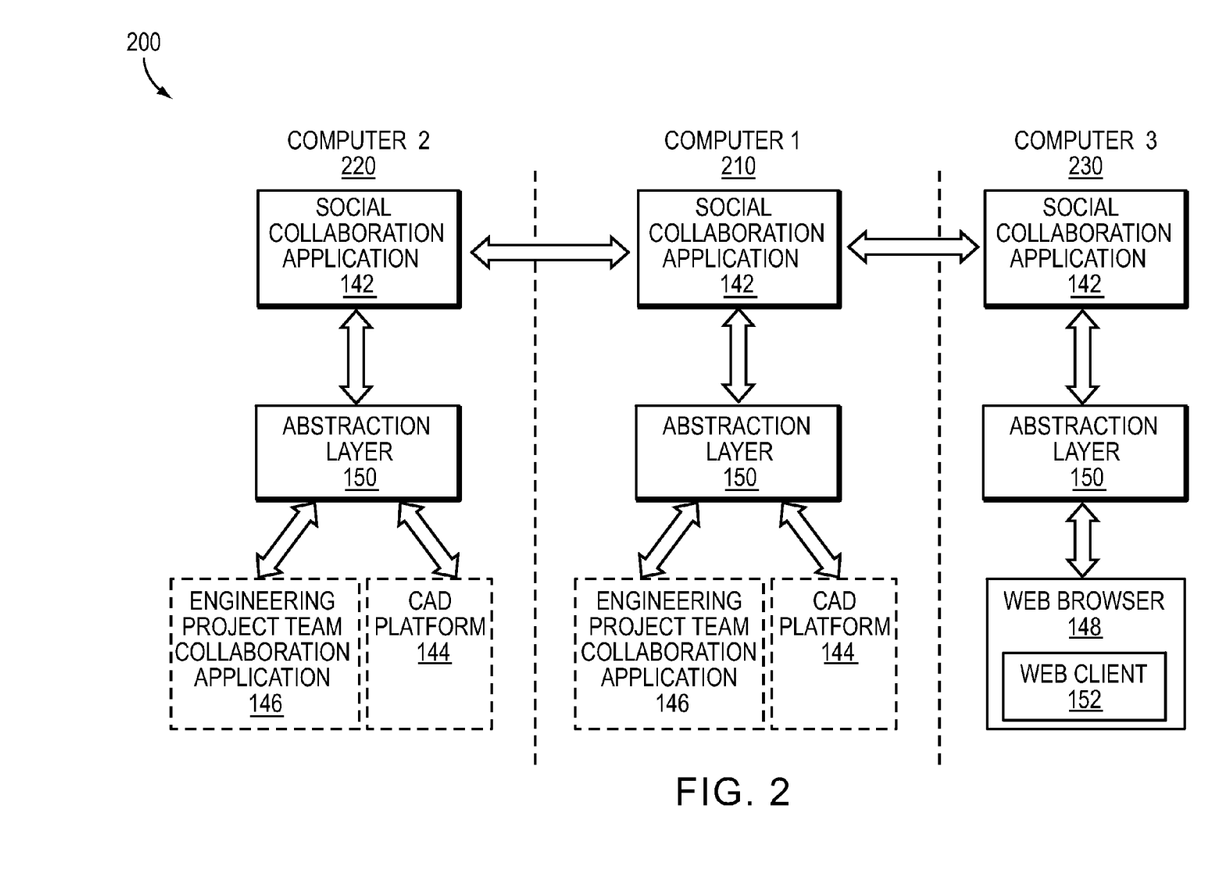
FIG. 2 is an illustration of example data flow between differing applications executing on different example computers in a social review session.

FIG. 2 is an illustration 200 of data flow between differing applications executing on different example computers in a social review session. While first, second and third computer 210, 220, 230 in FIG. 2 may contain all the various hardware and software components shown in relation to the example computer 100 of FIG. 1, various components are omitted in FIG. 2 for clarity. A first user (e.g., an architect of the CAD model) of a first computer 210 may have a social collaboration application 142 as well as a computer aided design (CAD) platform 144 and/or an engineering project team collaboration application 144 on their computer 210. An abstraction layer 150 on the first computer 210 may be provided to interface therebetween. The abstraction layer 150 may propagate a contact list with contacts (e.g., imported from the social collaboration application). The contacts displayed in the contact list may be all of the user's contacts, or, alternatively, may be a special subset of contacts, that have been filtered from a larger contact list based on their association with the CAD model, based on their association with a particular project, or otherwise, as discussed in more detail below.

Selected contacts may be invited to join the social review session. During the social review session the capabilities of the social collaboration application 142 may be used to permit video and voice conferencing between the users. Further, synchronized viewing of the CAD model and exchange of annotations (e.g., redlines) related thereto may be permitted. The abstraction layer 150 on the first computer 210 is utilized to receive indications of the first user's current view (e.g., view parameters) of the CAD model, as well as any annotations (e.g., redlines) relating to the current view. The abstraction layer 150 on the first computer then interfaces with an application program interface (API) of the social collaboration application 142 to transmit such information using the social collaboration application's data exchange capabilities, to one or more other users in the social review session. For instance, a second user on the second computer 220 may likewise have a social collaboration application 142 as well as a CAD platform 144 and/or an engineering project team collaboration application 146 on their computer 220. In such case, an abstraction layer 150 operating on the second user's computer 220 may receive the indication of the current view (e.g., view parameters) of the CAD model (e.g., so a dynamic view of the CAD model may be shown), as well as the annotations (e.g., redlines) relating to the current view, from the API of the social collaboration application 142 on the second computer 220, and cause an update of the display of the CAD model in the CAD platform 144 or the engineering project team collaboration application 146, as the case may be, on the second computer 220. Similarly, the second user may themselves change the current view and make their own annotations. The abstraction layer 150 on the second computer 220 may pass indications of the current view (e.g., view parameters) of the CAD model, as well as any annotations (e.g., redlines), to the API of the social collaboration application on the second computer 220, for transmission by the social collaboration application 142 back to the first computer 210. Such information may be propagated through the API of the social collaboration application 142 on the first computer 210 to the CAD platform 144 or the engineering project team collaboration application 146, as the case may be, executing on the first computer 210, to update the display.

Furthermore, a social review session may be established with one or more users that lack a CAD platform 144 or an engineering project team collaboration application 146 on their computer, but may at least have access to a web browser 148. For instance, a social review session may be established with a third user of a third computer 230. Again, the abstraction layer 150 on the first computer 210 may be utilized to receive indications of the current view of the CAD model on the first computer (e.g., here, instead of view parameters, snapshots may be used), as well as any annotations (e.g., redlines) relating to the current view. The abstraction layer 150 on the first computer 150 may then interface with the API of the social collaboration application 142 on the first computer 210 to transmit such information using the social collaboration application's data exchange capabilities. A social collaboration application 142 on the third computer 230 may receive such information and pass it, via the social collaboration application's API, and an abstraction layer 150, to a web client 152 executing within the web browse 148 on the third computer 230. The web client 152 may thereafter cause display of the current view of the CAD model (e.g., snapshots, or a dynamic view of the CAD model), as well as any annotations (e.g., redlines) relating to the current view, in the web browser 152. Similarly, the third user on the third computer 230 may themselves make their own manipulations and annotations. The web client 152 on the third computer 230 may pass indications of the current view (e.g., snapshots), as well as annotations (e.g., redlines), to the API of the social collaboration application 142 on the third computer 230, for transmission by the social collaboration application 142 back to the first computer 210. Such information may be propagated through the API of the social collaboration application 142 on the first computer 210 to the CAD platform 144 or the engineering project team collaboration application 146, as the case may be, executing on the first computer 210, to update the display.

During the social review session, snapshots of the current view and annotations (e.g., redlines) may be stored in association with time stamps, thereby creating a chronological record of the social review session. Such snapshots and annotations (e.g., redlines) may be later reviewed (e.g., played back), published to a wiki or other web page, or otherwise utilized after the social review session is complete. When published to a wiki or other web page, audio, video and other content exchanged in the social review session may also be included. Further details of such operation are discussed below.

Figure 3:
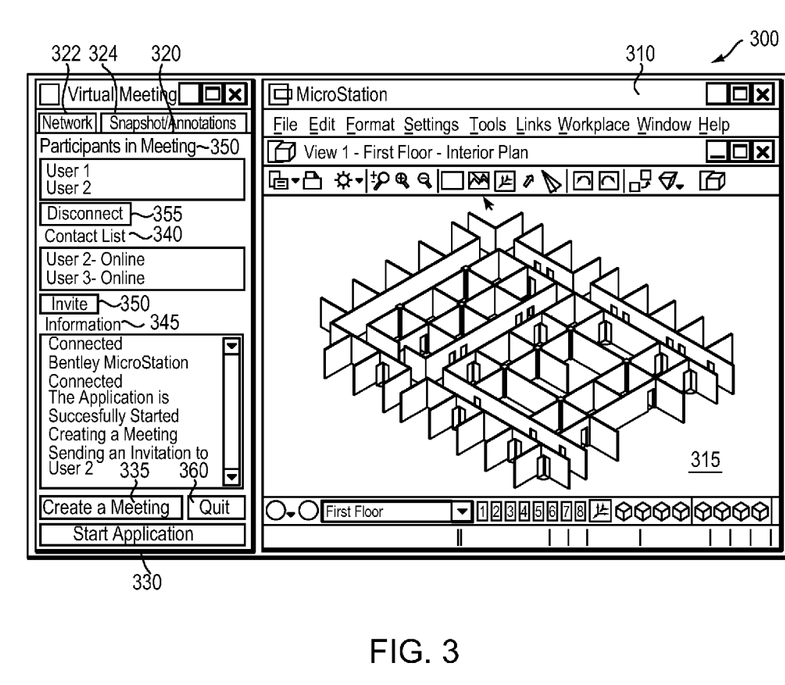
FIG. 3 is a screenshot of an example display on the first computer of FIG. 2, illustrating the establishment of a social review session with the user of the second computer of FIG. 2.

FIG. 3 is a screenshot 300 of an example display on the first computer 210 of FIG. 2, depicting the establishment of a social review session with the user of the second computer 220 of FIG. 2. It should be understood that the interface elements depicted in FIG. 3 (and the other figures which follow) are merely an example of one possible implementation of the present techniques, and that alternative implementations may include a wide variety of differing interface elements and arrangements thereof. Further, it should be understood that in connection with FIG. 3 (and FIG. 4 and FIG. 5) it is envisioned that the first user and the second user have access to a CAD platform 144 (e.g., the MicroStation® platform). However, the below description is equally applicable to a configuration were the first user and the second user utilize an engineering project team collaboration application 146 (e.g., ProjectWise® project team collaboration software).

An interface 310 for the CAD platform 144 may include, among other things, a depiction 315 of a CAD model. A social review interface 320 may be displayed in conjunction with the CAD model. The social review interface 320 may be a standalone interface (e.g., a separate window), incorporated into the CAD platform's interface 310 (e.g., functionality within its window(s)), or otherwise arranged. The social review interface 320 may have one or more tabs 322, 324 ("Network" tab and "Snapshots/Annotations" tab), though a wide variety of other arrangements are possible.

On a first tab 322, a first interface element (e.g., a "Start Application" button) may be provided, selection of which causes the abstraction layer 150 to connect to the social collaboration application 142 on the first computer 210. It should be understood, that in alternative embodiments, connection between the abstraction layer 150 and the social collaboration application 142 may be triggered in other manners. For example, rather than initiate such connection from within the social review interface 320, the connection may be initiated from within an interface (not shown) of the social collaboration application 142. Similarly, the connection may be automatic. In some embodiments, the abstraction layer 150 and the CAD platform 144 or the engineering project team collaboration application 146, as the case may be, may be launched in response to selection of an interface element from in the interface (not shown) of the social collaboration application 142. As such, a connection of the abstraction layer 150 to the social collaboration application 142 may be automatically established when such applications are launched.

Upon connection of the abstraction layer 150 to the social collaboration application 142, an information pane 345 may be updated to display this connected status. Further, a contact list may be propagated with contacts (e.g., imported from the social collaboration application 142). The contacts displayed in the contact list 340 may be all of the user's contacts, or, alternatively, may be a special subset of contacts, that have been filtered from a larger contact list based on their association with the CAD model being depicted by the CAD platform 144. For example, if the CAD model is maintained in association with a project having a project team (e.g., established by the engineering project team collaboration application 146), the filter may display only users assigned to the project team. Alternatively, where the CAD model is not explicitly associated with a project team, but is maintained in a file (e.g., a .dgn file) stored in a particular location in a folder structure and/or having a certain name format, a filter may display certain users based upon the folder structure or a naming convention. In such manner, the list of contacts displayed in the contact list 340 may be a specially selected subset of all of a user's contacts, which include the contacts likely to have an interest in the CAD model (e.g., stakeholders).

A second interface element (e.g., a "Create a Meeting" button) may be provided to initiate a social review session, while a third interface element (e.g., an "Invite" button) may be provided to invite one or more other users who have been selected in the contact list 340 to the initiated social review session. When invited participants receive a social review invitation, they may be prompted to elect how they would like to participate in the social review session, for example, using a CAD platform 144 or engineering project team collaboration application 146 available on their computer, or alternatively a web client 152 within a web browser 148. If a CAD platform 144 or engineering project team collaboration application 146 is not available on their computer, a web client 152 within a web browser 148 may be elected automatically, as the only option. When the invited participants accept their respective invitations, they may be shown in a participants field 350 (e.g., "Participants in Meeting" field) that displays the current participants of the social review session. For example, the participants field 350 may indicate that the first user ("User 1") of the first computer 210 and the second user ("User 2") of the second computer 220 are currently participants in the social review session related to the model. Information pane 345 may be updated to indicate that the participants have joined the social review session.

Still further, a forth interface element (e.g., a "Disconnect" button) 355 may be provided to disconnect from the social review session, while a fifth interface element (e.g., a "Quit" button) may, when actuated, cause the abstraction layer 150 to disconnect from the social collaboration application 142.

Figure 4:
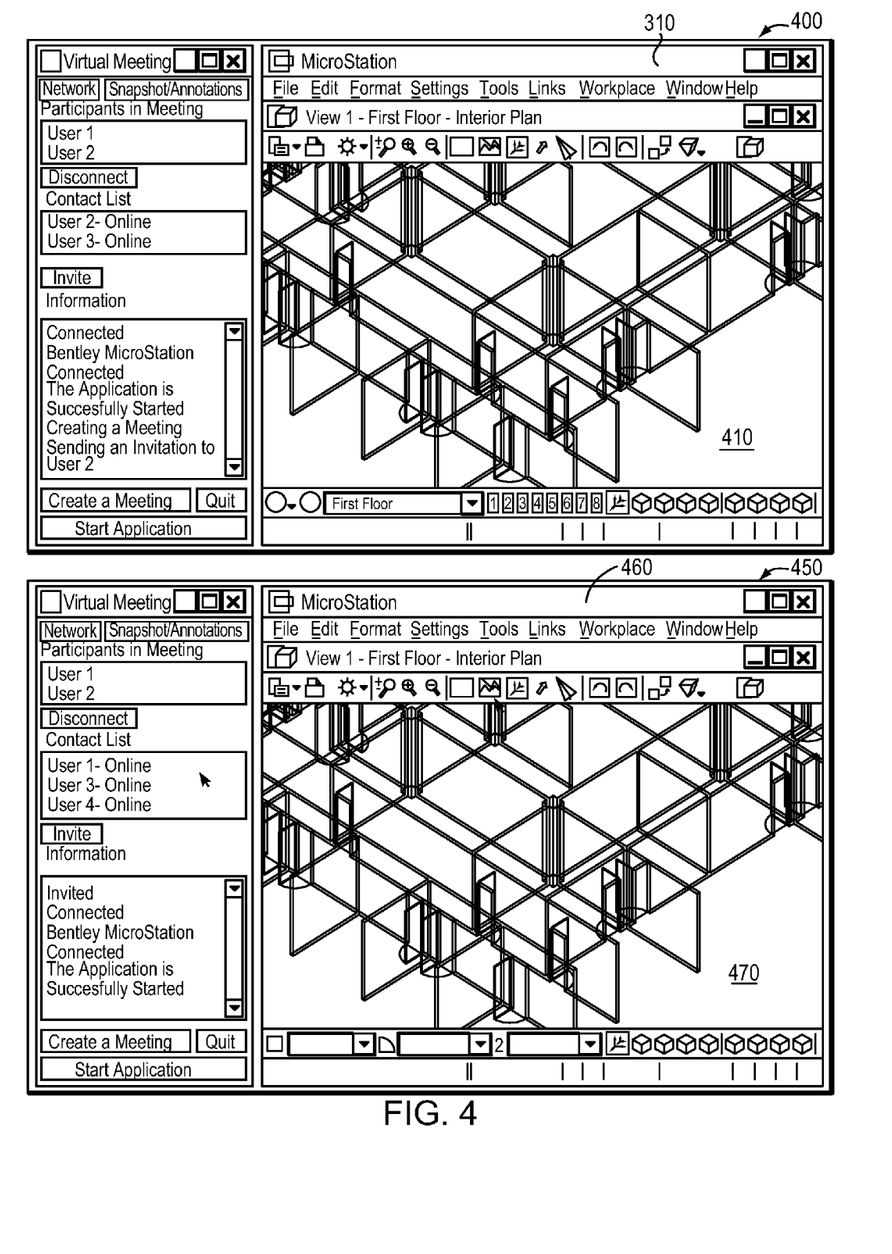
FIG. 4 is a screenshot of an example display on the first computer of FIG. 2, and a screen shot of an example display on the second computer of FIG. 2, depicting synchronized viewing of the CAD model during the social review session.

FIG. 4 is a screenshot 400 of an example display on the first computer 210 of FIG. 2, and a screen shot 450 of an example display on the second computer 220 of FIG. 2, depicting synchronized viewing of the CAD model during the social review session. In response to the second user joining the social review session, the abstraction layer 150 on the first computer 210 may transmit, via the social collaboration software 142, an indication of the file (e.g., the .dgn file) that stores the CAD model. The abstraction layer 150 on the second computer may then open the file and display a depiction of the CAD model within the interface 460. Alternatively, the abstraction layer 150 on the first computer 210 may transmit, via the social collaboration software 142, the actual file (e.g., the .dgn file) via the social collaboration software 142, or, as explained in more detail below, a snapshot of a depiction of the CAD model, to the second computer 220 for display.

Thereafter, viewing of the CAD model may be synchronized between the first computer 210 and the second computer 220 during the social review session. In response to the first user of the first computer 210 panning and/or zooming to display a particular region 410 of the CAD model, indications of the first user's current view (e.g., view parameters) are received at the abstraction layer 150 on the first computer 210, and sent via the social collaboration software 142, to the abstraction layer 150 on the second computer 220. The abstraction layer 150 then provides the indications of the first user's current view (e.g., view parameters) to the CAD platform 144 on the second computer 220, to cause the display of the identical region 470 of the CAD model within the interface 460 on the second computer 220. Likewise, should the second user pan and/or zoom to display another region of the CAD model, an indication of the second user's current view (e.g., view parameters) is sent back, via the social collaboration software 142, in similar manner. To coordinate who may change the view of the CAD model at a given moment, the first and second users may use chat and audio/video conferencing functionality (not shown) of the social collaboration software 142. In such manner, an explicit view control arbitration mechanism may not be needed, though, alternatively one could be provided.

Figure 5:
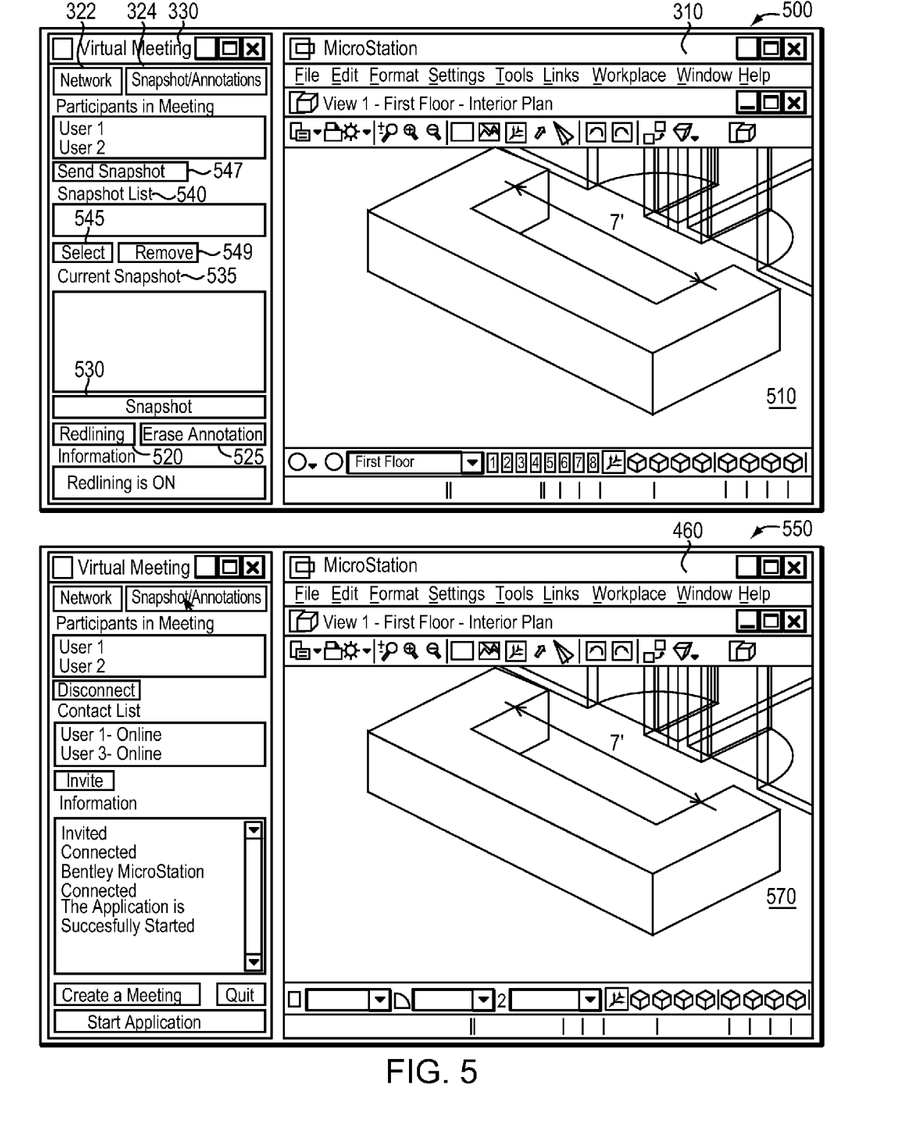
FIG. 5 is a screenshot of an example display on the first computer of FIG. 2, and a screenshot of an example display on the second computer of FIG. 2, depicting the exchange of annotations (e.g., redlines), and the capture of snapshots during the social review session.

FIG. 5 is a screenshot 500 of an example display on the first computer 210 of FIG. 2, and a screenshot 550 of an example display on the second computer 220 of FIG. 2, depicting the exchange of annotations (e.g., redlines), and the capture of snapshots during the social review session.

The social review interface 320 on the first computer 210 may display (e.g., after selection of tab 324) a variety of interface elements related to annotations (e.g., redlines) and snapshots. A first interface element (e.g., a "Redlining" button) may be provided in the social review interface 320 (e.g., on tab 324), selection of which allows the first user to draw annotations (e.g., redlines) on the depiction 510 of the CAD model in the interface 310 using an input device (e.g., a mouse) of the first computer 210. For example, annotations indicating a reception desk and dimensions thereof may be drawn on the depiction 510 of the CAD model in the interface 310. As the first user draws the annotations (e.g., redlines), information descriptive thereof (e.g., coordinates) may be captured by the abstraction layer 150 on the first computer 210 and transmitted, via the social collaboration application 142, to the abstraction layer 150 on the second computer 220, which, in response to such information (e.g., coordinates) draws corresponding annotations (e.g., redlines) on the interface 460 on the second computer 220. For example, the annotations indicating the reception desk and dimensions thereof may be drawn on the depiction 570 of the CAD model in the interface 460. Likewise, the user of the second computer 220 may also draw annotations (not shown), which are captured by the abstraction layer 150 on the second computer 220 and transmitted, via the social collaboration application 142, to the abstraction layer 150 on the first computer 220, for display. In such manner, annotations may be exchanged back and forth between the users. A second interface element (e.g., an "Erase Annotations" button) may, when activated, remove the current annotations, for example, when they are no longer needed.

A third interface element (e.g., a "Snapshot" button) 530 may be provided in the social review interface 320 (e.g., on tab 324), selection of which allows the first user to take a snapshot of the depiction 510 of the model, that may be useful for remembering the depiction and any annotations drawn thereon. When taken, a thumbnail image of the snapshot may be shown in a thumbnail view area ("Current Snapshot") 535. Further, an indication of the snapshot may be added to a list ("Snapshot List") 540 in the social review interface 320.

In addition to manually taken snapshots, snapshots may be automatically taken. For example, snapshots may be taken periodically in response to a timer, or in an event-based manner, for example, in response to a change of view (e.g., by a pan or a zoom) on the depiction of the CAD model. The automatically taken snapshots may be added to the list ("Snapshot List") 540 along with any manually taken snapshots. Each snapshot in the snapshot list 540 may be stored in association with a time stamp (not shown) indicating the time (e.g., in absolute terms or relative to the start of the social review session). In addition to storing snapshots, the annotations (e.g. redlines) may be stored in association with the time stamp (not shown). For example, in response to a change of view (e.g., by a pan or a zoom) on the depiction of the CAD model, the current annotations (e.g., redlines) may be stored in association with the time stamp. The annotations may then be cleared. By storing snapshots and annotations (e.g., redlines), a chronological record of the social review session may be created. Such snapshots and annotations (e.g., redlines) may be later reviewed (e.g., played back), published to a wiki or other web page, or otherwise utilized after the social review session is complete.

Further, the snapshots may be utilized during the social review session. For example, the first user may send snapshots to other users in the social review session. A fourth interface element (e.g., a "Select" button) 545 may be used to select a particular snapshot, and a fifth interface element (e.g., a "Send Snapshot" button) 547 may be used to send the particular snapshot to other users in the social review session. When the first user sends a snapshot it is passed by the abstraction layer 150 on the first computer 210, via the social collaboration application 142, to the abstraction layer 150 on the second computer 220, which may display the snapshot and add the snapshot to a list in the social review interface on the second computer 220. A fifth interface element (e.g., a "Remove" button) 549 may be provided to delete a snapshot if it is no longer needed.

As mentioned above, a social review session may be established with one or more users that lack a CAD platform 144 or an engineering project team collaboration application 146 on their computer, but may at least have access to a web browser 148. For instance, a social review session may be established with a third user of a third computer 230, which simply has a web browser 148.

Figure 6:
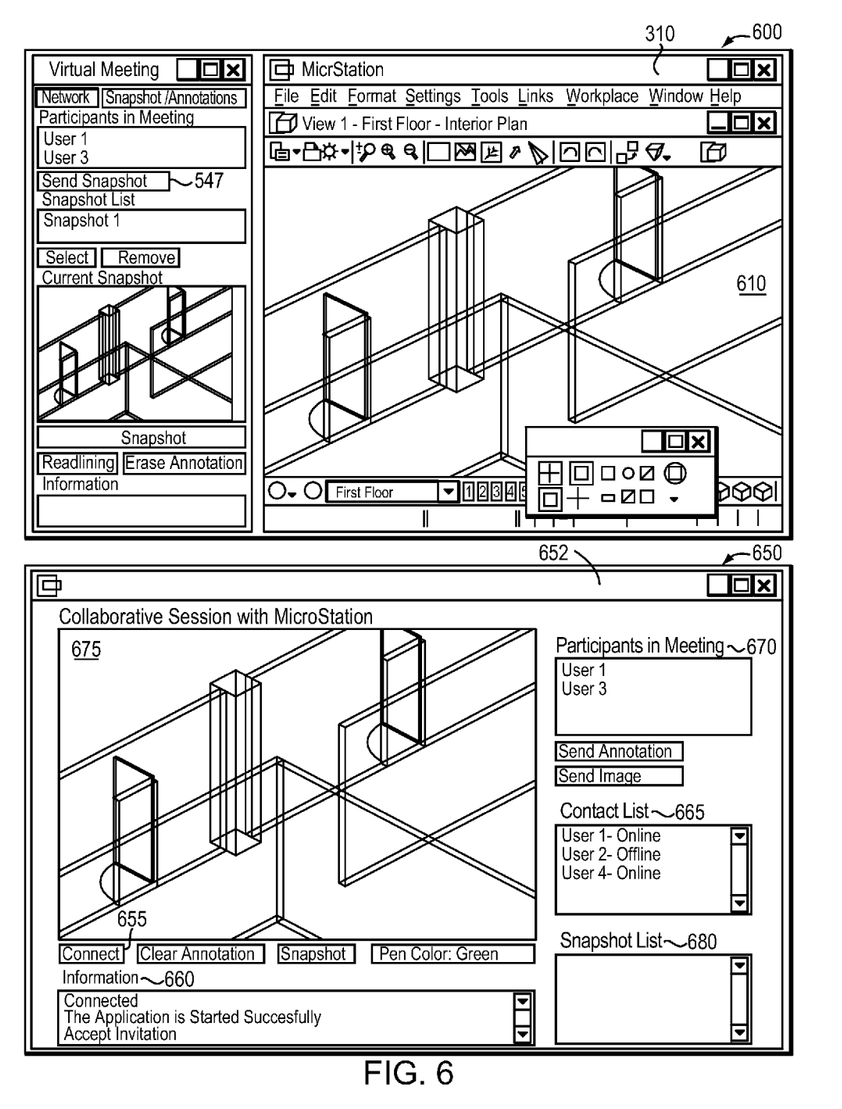
FIG. 6 is a screenshot of an example display on the first computer of FIG. 2, and a screenshot of an example display on the third computer of FIG. 2, depicting synchronized viewing of the CAD model during the social review session.

FIG. 6 is a screenshot 600 of an example display on the first computer 210 of FIG. 2, and a screenshot 650 of an example display on the third computer 230 of FIG. 2, depicting synchronized viewing of the CAD model during the social review session. It should be understood that in connection with FIG. 6 (and FIG. 7) it is envisioned that the first user of the first computer 210 has access to a CAD platform 144 (e.g., the MicroStation® platform) while the third user of the third computer 230 does not. However, the below description is equally applicable a configuration were the first user of the first computer 210 utilizes an engineering project team collaboration application 146 (e.g., Project-Wise® project team collaboration software), yet such software is not available to the third user of the third computer 230.

The third user may navigate their browser 148 to a designated uniform resource locator (URL), to download and execute a web client 152 provided there. Web client 152 may then display a social review web interface 652 within the web browser on the third computer 230. Similar to the social review interface 320 on the first computer 210, the social review web interface 652 may include a first interface element (e.g., a "Connect" button) 655, selection of which causes the abstraction layer 150 to connect to the social collaboration application 142 on the third computer 230. It should also be understood, that in alternative embodiments, connection between the abstraction layer 150 and the social collaboration application 142 may be triggered in other manners, for example, may occur automatically upon loading the web client 152. Upon connection of the abstraction layer 150 to the social collaboration application 142, an information pane (e.g., "Information") 660 may be updated to display this connected status. Further, a contact list 665 may be propagated with contacts (e.g., imported from the social collaboration application 142). A participants field 670 (e.g., "Participants in Meeting" field) may display the current participants of the social review session. When the third user accept an invitation to join the social review session, an indication of the first user and the third user may be shown in the participants field 670.

In order to conduct a social review session, the first user may use the third interface element (e.g., the "Snapshot" button) 530 in the social review interface to take a snapshot of the depiction 610 of the model. The first user may then, using the fifth interface element (e.g., a "Send Snapshot" button) 547 send the snapshot to the third user on the third computer 230. As described above, the when the first user sends a snapshot, it is passed via the social collaboration application 142, to the third computer, where the web client 152 executing in the web browser 148 on the third computer 220, via the abstraction layer 150, receives the snapshot from the social collaboration application 142. A display region in the social review web interface 652 displays an image 675 of the current snapshot. Further, an indication of the snapshot may be added to a list ("Snapshot List") 680 in the social review web interface 652. It should be understood that, in contrast to the configuration discussed above where both users use a CAD platform 144, rather than exchange view parameters to indicate manipulates of the view of the CAD model, here simply snapshots of the CAD model are exchanged. Accordingly, the web client 152 need not have access to a copy of the underlying file (e.g. .dgn file) which stores the CAD model.

Figure 7:
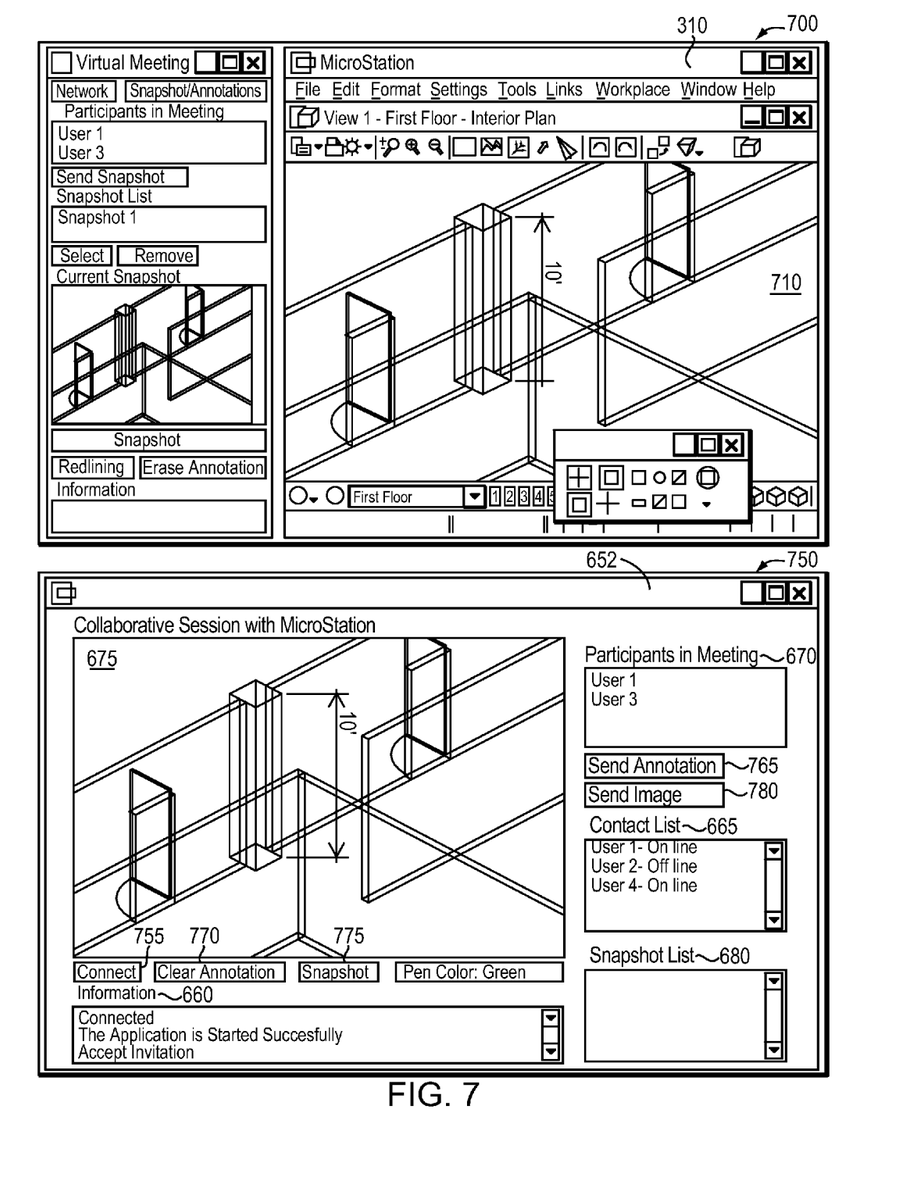
FIG. 7 is a screenshot of an example display on the first computer of FIG. 2, and a screenshot of an example display on the third computer of FIG. 2, depicting the exchange of annotations (e.g., redlines) during the social review session.

FIG. 7 is a screenshot 700 of an example display on the first computer 210 of FIG. 2, and a screenshot 750 of an example display on the third computer 230 of FIG. 2, depicting the exchange of annotations (e.g., redlines) during the social review session. The user of the third computer may draw annotations (e.g., redlines) on the image 675 of the current snapshot. For example, annotations 760 indicating a proposed dimension of a column may be drawn on the image 675 of the current snapshot. A second interface element (e.g., a "Send Annotations" button) 765 may be provided in the social review web interface 652, selection of which allows the third user to transmit information descriptive of the annotations (e.g., coordinates), via the social collaboration application 142, to the abstraction layer 150 on the first computer 210, which, in response to such information (e.g., coordinates) draws corresponding annotations (e.g., redlines) 720 on the depiction 710 of the CAD model in the interface 310. Similarly, the first user of the first computer 210 may send their own annotations (e.g., redlines) by drawing them on the depiction 710 of the CAD model in the interface 310 and then transmit a new snapshot with the annotations, via the social collaboration application 142, to the web client 152 on the first computer 230, which, in response, may display the new snapshot in the social review web interface 652.

A third interface element (e.g., a "Clear Annotations" button) 770 may be provided in the social review web interface 652 to remove any annotations (e.g., redlines), while a forth interface element (e.g., a "Snapshot" button) 770 may be used to take a new snapshot of the image 675. A fifth interface element (e.g., a "Send Image" button) 780 may be provided to send a snapshot to other users in the social review session, using the techniques discussed above. Finally, a sixth interface element (e.g., a "Pen Color" button) may be used to change the color of drawn annotations.

Figure 8:
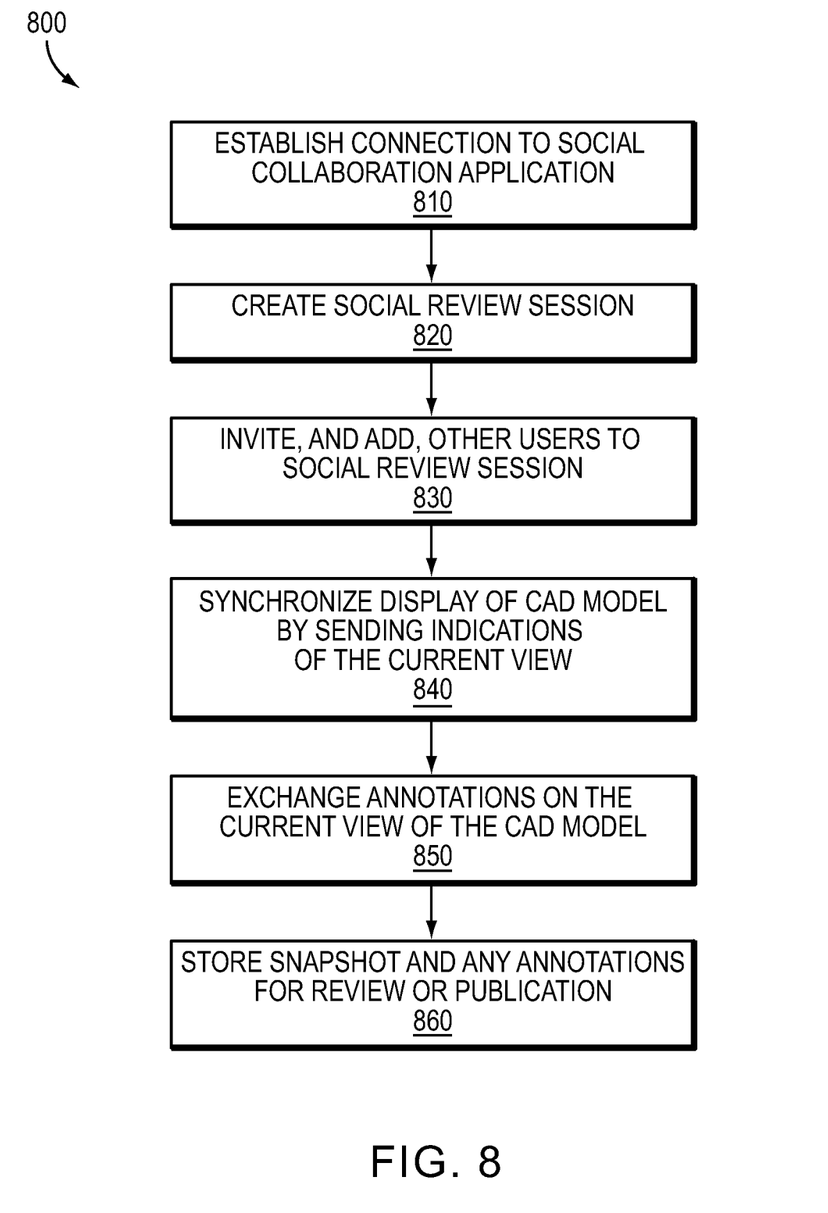
FIG. 8 is a flow diagram of an example sequence of steps for establishing a social review session, synchronizing viewing of a CAD model within the social review session, and exchanging annotations within the social review session.

FIG. 8 is a flow diagram of an example sequence of steps 800 for establishing a social review session, synchronizing viewing of a CAD model within the social review session, and exchanging annotations within the social review session. At step 810, the abstraction layer 150 establishes a connection to the social collaboration application 142. At step 820, a social review session is created. Further, at step 830 one or more other users are invited to the social review session, and upon confirmation of their acceptance, are added to current participants in the social review session.

At step 840, the view of the CAD model is synchronized with the users in the social review session. For example, as discussed above, in one embodiment, the abstraction layer 150 is utilized to receive indications of the current view (e.g., view parameters) of the CAD model, and the abstraction layer 150 then interfaces with the API of the social collaboration application 142 to transmit such information using the social collaboration application's data exchange capabilities, to one or more other users in the social review session. Alternatively, as discussed above, the abstraction layer 150 captures (e.g., takes a snapshot of) the current view, and then interfaces with the API of the social collaboration application 142 to transmit such information using the social collaboration application's data exchange capabilities, to one or more other users in the social review session. Such information (e.g., view parameters or snapshots) may be propagated through the API of the collaboration application 142 from the collaboration application 146 to the abstraction layer 150 on the other user's computers, to update their display.

At step 850, annotations (e.g., redlines) relating to the current view of the CAD model are exchanged with other users in the social review session. For example, as discussed above, in one embodiment, the abstraction layer 150 is utilized to receive annotations (e.g., redlines) drawn on the current view, and then interfaces with the API of the social collaboration application 142 to transmit such information using the social collaboration application's data exchange capabilities, to one or more other users in the social review session. Alternatively, as discussed above, the abstraction layer 150 captures (e.g., records coordinates of) the first user's annotations (e.g., redlines) and then interfaces with the API of the social collaboration application 142 to transmit such information using the social collaboration application's data exchange capabilities, to one or more other users in the social review session. Such information may be propagated through the API of the collaboration application 142 from the collaboration application 146 to the abstraction layer 150 or web client, as the case may be, on the other user's computers, to update their display. At step 860, for example, in response to a change of view (e.g., by a pan or a zoom) a snapshot and any annotations (e.g., redlines) may be stored in association with a timestamp, thereby creating a chronological record of the social review session. As discussed above, such snapshots and annotations (e.g., redlines) may be later reviewed (e.g., played back), published to a wiki or other web page, or otherwise utilized.

While the above description discusses various embodiments of the present disclosure, it should be apparent that a number of modifications and/or additions may be made without departing from the disclosure's intended spirit and scope. Further, it should be understood that many of the above-described techniques may be implemented in software, in hardware, or in a combination thereof. A software implementation may include computer-executable instructions stored in a non-transitory computer-readable storage medium, such as a volatile or persistent memory, a hard-disk, a compact disk (CD), or other tangible medium. A hardware implementation may include specially configured processors, logic circuits, application specific integrated circuits, and/or other types of hardware components. Further, a combined software/hardware implementation may include both computer-executable instructions stored in a non-transitory computer-readable storage medium, as well as one or more hardware components, for example, processors, memories, etc. Accordingly, it should be understood that the above descriptions are meant to be taken only by way of example.

What is claimed is:

1. A method for social review of computer aided design (CAD) projects, comprising:
   executing a CAD application on the first computer;

establishing a connection between an abstraction layer associated with the CAD application on the first computer and a separate social collaboration application on the first computer;

in response to selection of interface elements in the CAD application by a first user, causing the separate social collaboration application to create a social review session between at least the first user of the first computer and a second user of a second computer, wherein the second computer lacks a copy of the CAD application but has a copy of a different application;

using the social collaboration application on the first computer to synchronize the first user's current view of a CAD model in the CAD application on the first computer with a view seen by the second user in the different application on the second computer by receiving indications of the first user's current view of the CAD model from the CAD application on the first computer, at the abstraction layer on the first computer, and interfacing, by the abstraction layer on the first computer, with an application program interface (API) of the social collaboration application on the first computer to cause the social collaboration application on the first computer to transmit the indications of the first user's current view of the CAD model to the social collaboration application on the second computer; and using the social collaboration application on the first computer to exchange annotations on the first computer made by the first user on the current view of the CAD model with the second user of the different application on the second computer by receiving indications of the first user's annotations on the current view of the CAD model from the CAD application at the abstraction layer on the first computer, and interfacing, by the abstraction layer on the first computer, with the API of the social collaboration application on the first computer to cause the social collaboration application on the first computer to transmit the annotations to the social collaboration application on the second computer.

2. The method of claim 1, wherein the different application is a web client executing within a web browser, and the method further comprises:

sending a social review invitation from the first computer to the second computer;

accepting the social review invitation at the second computer; and electing, at the second computer, to utilize the web client to conduct the social review session.

3. The method of claim 2, wherein the electing is based on a selection made by the second user.

4. The method of claim 2, wherein the electing is based on unavailability of a CAD application at the second computer.

5. The method of claim 1, wherein the different application is a web client executing within a web browser and the using the social collaboration application to synchronize further comprises:

receiving, at the social collaboration application on the second computer, the indications of the first user's current view of the CAD model;

passing, via an API of the social collaboration application on the second computer, the indications of the first user's current view of the CAD model to the web client on the second computer; and updating a current view of the CAD model within the web client on the second computer in response to the passed indications.

6. The method of claim 1, wherein the indications of the first user's current view of the CAD model are snapshots.

7. The method of claim 1, wherein the different application is a web client executing within a web browser and the using the social collaboration application to exchange annotations further comprises:

receiving, at the social collaboration application on the second computer, the annotations made by the first user;

passing, via an API of the social collaboration application on the second computer, the annotations of the first user to the web client on the second computer; and updating a current view of the CAD model within the web client on the second computer in response to the passed annotations.

8. The method of claim 1, further comprising:

storing the indications of the current view of the CAD model and any annotations made on the current view of the CAD model in association with timestamps, each time a change is made in the current view of the CAD model.

9. The method of claim 8, further comprising:

publishing the indications of the current view of a CAD model and any annotations made on the current view of the CAD model to a web page.

10. The method of claim 1, wherein the annotations are redlines.

11. The method of claim 1, wherein the CAD application is a CAD platform.

12. The method of claim 1, wherein the CAD application is an engineering project team collaboration application.

13. The method of claim 1, wherein the creating further comprises:

displaying a contact list of selected contacts to the first user of the first computer, the selected contacts filtered from a larger contact list to include only contacts having an association with the CAD model or a project of which the CAD model is a part; and receiving a selection from the first user of one or more contacts, from the selected contacts, to invite to the social collaboration session.

14. The method of claim 1, wherein the social collaboration application is a chat, audio and/or video conferencing application.

15. The method of claim 14, wherein the indications of the first user's current view of the CAD model in the CAD application are snapshots.

16. The method of claim 14, wherein the second computer lacks a copy of the CAD application and the second user's view of the CAD model in shown in a different application on the second computer.

17. An apparatus for social review of computer aided design (CAD) projects, comprising:

a processor;

a memory coupled to the processor and configured to store executable instructions for execution by the processor, the executable instructions including instructions for:

a social collaboration application configured to communicate with other social collaboration applications on other apparatus;

a CAD application separate from the social collaboration application, the CAD application configured to display a view of a CAD model to a first user;

an abstraction layer associated with the CAD application, the abstraction layer configured to
establish a connection with the social collaboration application on the apparatus,
in response to selection of interface elements in the CAD application by a first user, cause the separate social collaboration application on the apparatus to create a social review session between the social collaboration application on the apparatus and a social collaboration application used on a second apparatus that lacks a copy of the CAD application;
use the social collaboration application to synchronize the first user's view of the CAD model in the CAD application on the apparatus with a view seen by a second user in a different application on the second apparatus that lacks the copy of the CAD application, by passing indications of the first user's view of the CAD model from the CAD application on the apparatus to an application program interface (API) of the social collaboration application on the apparatus to cause the social collaboration application on the apparatus to transmit over the social review session the indications of the first user's view of the CAD model to the social collaboration application used on the second apparatus;
use the social collaboration application to exchange annotations made by the first user on the view of the CAD model in the CAD application on the apparatus with the different application on the second apparatus, by passing the annotations to the API of the social collaboration application on the apparatus to cause the social collaboration application on the apparatus to transmit the annotations over the social review session to the social collaboration application on the second apparatus.

18. The apparatus of claim 17, wherein the indications of the first user's view of the CAD model are snapshots.

19. The apparatus of claim 17, wherein the annotations are redlines.

20. The apparatus of claim 17, wherein the CAD application is a CAD platform.

21. A method for social review of computer aided design (CAD) projects, comprising:
executing a CAD application on the first computer;
in response to selection of interface elements in the CAD application by a first user, causing a separate chat, audio and/or video conferencing application on the first computer to create a social review session with a chat, audio and/or video conferencing application on the second computer; and
using the social review session created by the chat, audio and/or video conferencing application on the first computer to synchronize the first user's view of a CAD model in the CAD application on the first computer with a second user's view of the CAD model in an application on the second computer, by passing indications of the first user's view of the CAD model from the CAD application on the first computer to the chat, audio and/or video conferencing application on the first computer, to cause the chat, audio and/or video conferencing application to transmit the indications of the first user's view of the CAD model over the social review session to the chat, audio and/or video conferencing application on the second computer, to update the view of the CAD model on the second computer.

22. The method of claim 21, further comprising:
using the social review session created by the chat, audio and/or video conferencing application on the first computer to exchange annotations made by the first user on the view of the CAD model in the CAD application on the first computer to annotate the view of the CAD model in the application on the second computer, by passing the annotations to the chat, audio and/or video conferencing application, to cause the chat, audio and/or video conferencing application on the first computer to transmit the annotations over the social review session to the chat, audio and/or video conferencing application on the second computer, to have the annotations shown on the view of the CAD model on the second computer.

23. The method of claim 21, wherein the application on the second computer is a web client executing within a web browser, and the method further comprises:
sending a social review invitation from the first computer to the second computer;
accepting the social review invitation at the second computer; and
electing, at the second computer, to utilize the web client at the second computer to view the CAD model.

24. A non-transitory computer readable medium storing executable instructions for execution on a processor, the executable instructions, when executed, operable to:
executing a CAD application on the first computer;
in response to selection of interface elements in the CAD application by a first user, causing a separate chat, audio and/or video conferencing application on the first computer to create a social review session with chat, audio and/or video conferencing application on the second computer;
use the social review session created by the chat, audio and/or video conferencing application on the first computer to synchronize a first user's view of a computer aided design (CAD) model in the CAD application on the first computer with a second user's view of the CAD model in an application on the second computer, by passing indications of the first user's view of the CAD model from the CAD application on the first computer to the chat, audio and/or video conferencing application on the first computer, to cause the chat, audio and/or video conferencing application on the first computer to transmit the indications of first user's view of the CAD model over the social review session to the chat, audio and/or video conferencing application on the second computer, to update the view of the CAD model on the second computer; and
use the chat, audio and/or video conferencing application on the first computer to exchange annotations made by the first user on the view of the CAD model in the CAD application on the first computer, by passing the annotations from the CAD application on the first computer to the chat, audio and/or video conferencing application on the first computer, to cause the chat, audio and/or video conferencing application on the first computer to transmit the annotations over the social review session to the chat, audio and/or video conferencing application on the second computer, to have the annotations shown on the view of the CAD model on the second computer.

* * * * *

UNITED STATES PATENT AND TRADEMARK OFFICE
CERTIFICATE OF CORRECTION

PATENT NO.           : 9,454,623 B1
APPLICATION NO.      : 12/970634
DATED                : September 27, 2016
INVENTOR(S)          : Igor Kaptsan Page 1 of 1

It is certified that error appears in the above-identified patent and that said Letters Patent is hereby corrected as shown below:

In the Claims
Claim 24, Column 16, Line 34 reads:
computer to create a social review session with chat,
Should read:
computer to create a social review session with a chat, Signed and Sealed this
Second Day of October, 2018

Andrei Iancu
*Director of the United States Patent and Trademark Office*